United States Patent [19]

Takahashi et al.

[11] Patent Number: 5,348,123
[45] Date of Patent: Sep. 20, 1994

[54] BRAKE ACTUATING APPARATUS FOR A VEHICLE

[75] Inventors: Kimio Takahashi; Katsuya Miyake, both of Saitama; Takashi Kunimi, Tokyo; Tatsuo Ogawahara; Tadashi Kobayashi, both of Saitama, all of Japan; Kunio Fukaya, Neuilly sur Seine, France

[73] Assignees: Akebono Brake Industry Co., Ltd., Tokyo; Akebono Research and Development Centre Ltd., Saitama, both of Japan

[21] Appl. No.: 935,888

[22] Filed: Aug. 28, 1992

[30] Foreign Application Priority Data

Sep. 2, 1991 [JP] Japan ................... 3-221872
Sep. 5, 1991 [JP] Japan ................. 3-79430[U]

[51] Int. Cl.⁵ ............................................. F16D 55/08
[52] U.S. Cl. .................... 188/72.1; 188/72.8; 188/162
[58] Field of Search .................. 188/162, 156, 72.4, 188/72.6, 72.7, 72.8, 106 P, 106 A, 106 R, 72.1, 161, 163; 303/115.2, 3; 60/545

[56] References Cited

U.S. PATENT DOCUMENTS

| | | | |
|---|---|---|---|
| 4,487,295 | 12/1984 | Mitchell | 188/72.8 |
| 4,529,067 | 7/1985 | Scott | 188/72.8 |
| 4,658,939 | 4/1987 | Kircher et al. | 188/72.8 X |
| 4,721,190 | 1/1988 | Schmidt et al. | 188/72.8 X |
| 4,784,244 | 11/1988 | Carre et al. | 188/162 X |
| 4,793,447 | 12/1988 | Taig et al. | 188/72.8 X |
| 4,809,824 | 3/1989 | Fargier et al. | |
| 4,836,338 | 6/1989 | Taig | 188/72.1 |
| 5,107,967 | 4/1992 | Fujita et al. | 188/72.8 X |

*Primary Examiner*—Douglas C. Butler
*Attorney, Agent, or Firm*—Finnegan, Henderson, Farabow, Garrett & Dunner

[57] ABSTRACT

A brake actuating apparatus which includes a motor disposed at a brake caliper, a driving piston connecting through a converting member which converts a rotary motion of the motor into a linear motion, and a fluid chamber disposed between the driving piston and a pad urging piston for urging the brake pad in the brake caliper, and a diameter of the driving piston is arranged smaller than that of the pad urging piston.

26 Claims, 3 Drawing Sheets

BRAKE ACTUATING APPARATUS FOR A VEHICLE

BACKGROUND OF THE INVENTION

1. Field of the Invention

The present invention relates generally to a brake actuating apparatus for a vehicle, and more particularly to an actuating apparatus of a type in which a hydraulic pressure applied to a brake is controlled by a motor.

2. Related Art

Conventionally, a vehicle has employed an auxiliary brake actuating system together with a brake pedal depressing force for achieving so called an anti-lock and traction controls. Various types of a brake actuating apparatus acting as the auxiliary brake actuating system have conventionally been known as disclosed, for example, in Unexamined Japanese Patent Application (OPI) No. Hei. 1-266050.

FIG. 1 is a schematic view showing the fundamental structure of the conventional brake actuating apparatus taught in the OPI No. Hei. 1-266050. The conventional brake actuating apparatus shown in FIG. 1 is provided with a power cylinder 54 which is connected through solenoid plungers 52, 53 to an accumulator 50 into which brake pressure is accumulated by an electric pump 51. The power cylinder 54 supplies hydraulic pressure to a brake caliper 55 of each of brake cylinders of the vehicle wheels through a brake pipe 56. The solenoid plungers 52, 53 are independently controlled by a signal from a central control unit (not shown) to thereby control the pressure to the brake caliper 55.

By the way, it is more preferable to independently control each of the vehicle wheels. In the conventional brake actuating apparatus described above, however, since a common hydraulic pressure is applied to all the four wheels, it is difficult to appropriately control the brake pressure. Further, the brake pipes connecting the accumulator to each of the brake cylinders and also the solenoid plungers for the brake control are required, which causes the apparatus to be bulky and intricate. Further, since the conventional brake actuator of this type is spaced apart from the brake caliper, the reduction in its size is so limited.

On the other hand, another conventional art U.S. Pat. No. 4,809,824 teaches to eliminate the drawbacks accompanying the afore-described conventional apparatus, as shown in FIG. 2. FIG. 2 is a sectional view showing a brake actuating apparatus disclosed in the U.S. Pat. No. 4,809,824. In this apparatus, a driving force of an electric motor 40 is transmitted to a ball screw 44 through a speed reducer 43 and a solenoid clutch 41 so that a slider 45 which engages with the ball screw 44 urges against a friction pad 46.

The latter conventional apparatus, however, still requires a bulky motor 40 and speed reducer 43 for obtaining a sufficient brake force, which cause the apparatus to be large in size. Further, the apparatus is provided with the solenoid clutch 41 for compensating the deterioration of the responsibility due to the bulk in components and intricacy in structure, which causes the structure more bulky and intricate and would increase load to a spring.

Furthermore, in the conventional apparatus shogun in FIG. 2, a depressing force applied to or stroke of the brake pedal is detected by a sensor (not shown), and an electric control device outputs electric current corresponding to an output signal of the sensor to the motor 40 to drive the brake actuating apparatus. This type of brake actuating apparatus is so called as a by-wire type. The by-wire type of the brake actuating apparatus is in fact advantageous with respect in that it is easy to be applied to an anti-skid brake system and/or traction control system since the electric signal is applicable to various kinds of control. Further, since the control structure of the brake force is relatively simple compared to the conventional apparatus as described above the utility demand of this type of brake actuating apparatus may more increase in future. However, this type of brake actuating apparatus suffers from a problem that the actuating apparatus would not be controlled when occurring an unexpected electrical defect due to a fault of the sensor or a breakdown of electric wires, since the by-wire type brake actuating apparatus electrically controls the whole the operational force for the brake apparatus in accordance with the electric signal supplied from the sensor detecting the depressing force applied to or stroke of the brake pedal, as different from the former conventional mechanical brake operating structure employing the hydraulic pressure or mechanical link system. Accordingly, the conventional brake actuating apparatus would raise a serious problem in safety.

SUMMARY OF THE INVENTION

The present invention was made in view of the foregoing difficulties or problems accompanying the conventional brake actuating apparatus and, therefore, it is an object to provide a brake actuating apparatus small in size and simple in structure with light weight and improving in responsibility.

Another object of the invention is to provide a brake actuating apparatus capable of applying a brake force independently to each of wheel cylinders of vehicle wheels.

It is still another object of the invention to provide a brake actuating apparatus of a by-wire type having a mechanical brake operation system which operates to brake vehicle wheels even if an electric control of the brake actuating apparatus becomes fault.

It is still another object of the invention to provide a brake actuating apparatus having an electrical and mechanical brake operation system which is employable also for a parking brake.

The above and other objects of the invention can be achieved by a provision of a brake actuating apparatus disposed on a brake caliper which, according to the present invention, includes a motor, a driving piston connecting through a converting member which converts a rotary motion of the motor into a linear motion, and a fluid chamber disposed between the driving piston and a pad urging piston for urging the brake pad in the brake caliper, and a diameter of the driving piston is arranged smaller than that of the pad urging piston.

In the brake actuating apparatus of the invention, torque of the motor actuates the driving piston through the speed reducer and the converting member thereby to increase the fluid pressure in the fluid chamber. The pad urging piston disposed in the brake caliper is activated to move for braking a vehicle wheel. Since the diameter of the driving piston is arranged smaller than that of the pad urging piston, a boost effect can be attained and, accordingly, a large braking force can be generated without deteriorating a responsibility According to another aspect of the invention, the brake actuating apparatus includes a piston slidably supported by a brake caliper, a first brake pad urged by the piston, a second brake pad urged by the brake caliper and disposed opposite the first brake pad, a member to be braked which is disposed between the first and second brake pads, a nut member operationally engaging with the piston, a screw member screwed into the nut meter for operating the nut men, bet to move in the axial direction of the screw, and a motor for supplying a rotational force to the screw member. The brake actuating apparatus of the invention is characterized in further including a rotational shaft engageable with the screw member through a clutch mechanism, and only when the rotational shaft receives a rotational force from the outside the clutch mechanism engages with the screw member to transmit a rotational force to the screw men, bet to brake the member to be braked with the brake pads which are urged by moving the piston.

According to the other aspect of the invention, the brake actuating apparatus is further provided with a ball lump mechanism disposed between the clutch mechanism and the rotational shaft as a mechanism for engaging the clutch mechanism only when the rotational shaft receives the rotational force from the outside.

According to still other aspect of the invention, the rotational shaft is provided with a lever connected to a side (parking) brake apparatus.

According to still other aspect of the invention, the brake actuating apparatus includes a motor which is driven by a signal from an electronic control apparatus, a screw member driven to rotate by the motor, and a piston constructed to generate by moving inside the cylinder a hydraulic pressure in the hydraulic pressure generating chamber due to the rotation of the screw member. The brake actuating apparatus is characterized in that a rotational shaft is provided engageable with the screw member through a clutch mechanism, and only when the rotational shaft receives a rotational force from the outside the clutch mechanism engages with the screw member to transmit the rotational force, so that the piston is moved through inside the cylinder to thereby generate a brake pressure.

DESCRIPTION OF THE PREFERRED EMBODIMENTS

The preferred embodiments of the present invention will now be described in detail with reference to accompanying drawings.

Figure 1:
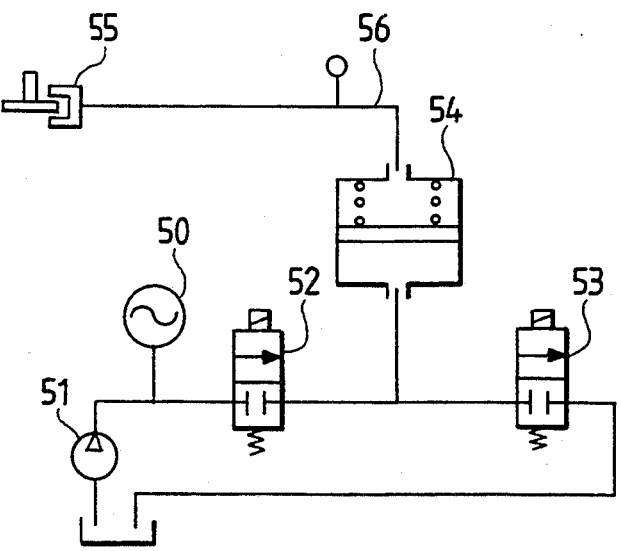
FIG. 1 is a schematic view showing the fundamental structure of the conventional brake actuating apparatus.
Figure 2:
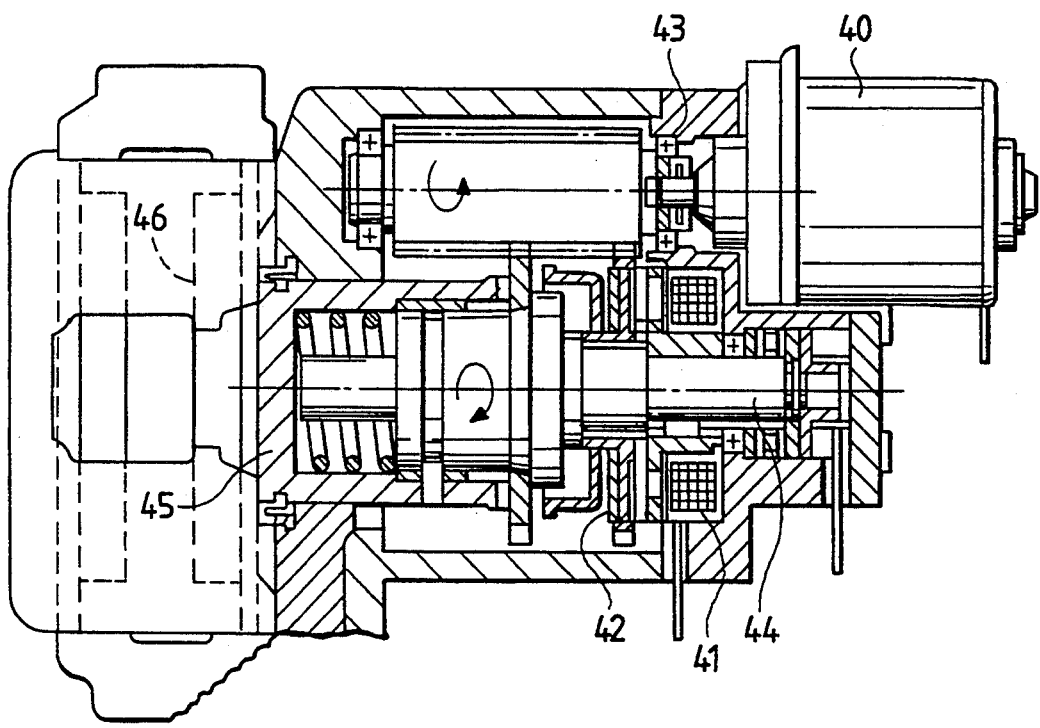
FIG. 2 is a sectional view showing another conventional brake actuating apparatus.
Figure 3:
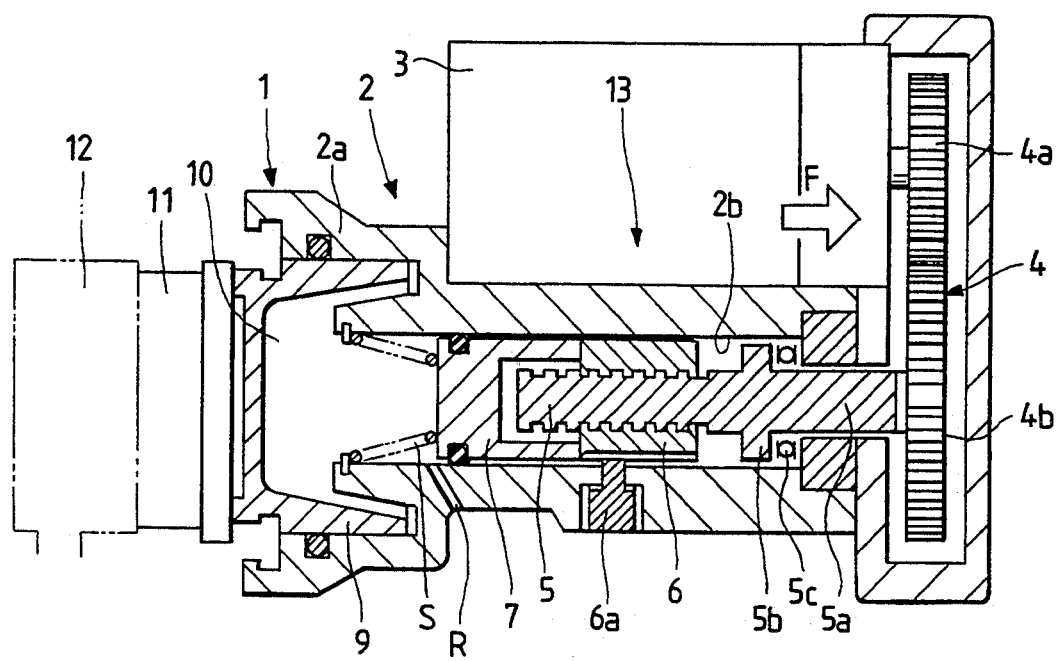
FIG. 3 is a sectional view showing a brake actuating apparatus according to a first embodiment of the invention.
Figure 4:
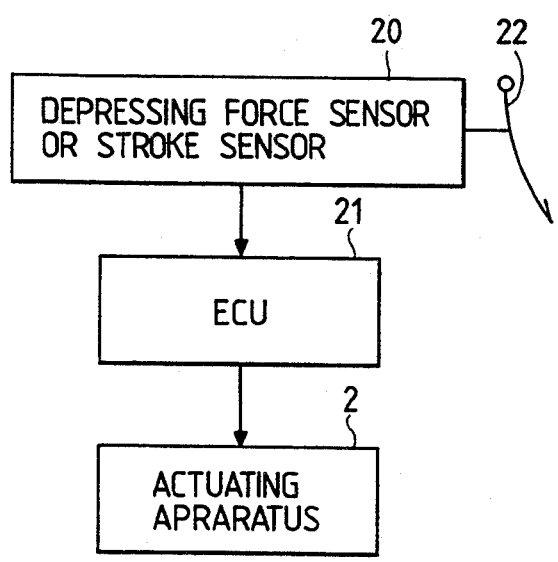
FIG. 4 illustrates a block diagram for explaining an operation of the brake actuating apparatus shown in FIG. 3.

FIG. 3 is a sectional view showing a brake actuating apparatus according to a first embodiment of the invention, and FIG. 4 illustrates a block diagram for explaining an operation of the brake actuating apparatus shown in FIG. 3.

A brake caliper 1 is supported by a guide member (not shown) slidably in a direction of the rotational axis of a disc 12. The brake caliper 1 accommodates therein a brake pad 11 and a pad urging piston 9 for urging the brake pad 11 against the disc 12. A brake actuating apparatus 2 is unitary formed with the brake caliper 1. The brake actuating apparatus 2 has a relative rigidity and is constructed as completely integrated or partially integrated with the caliper. The brake actuating apparatus 2 is constituted by a frame body 2a having inside a cylindrical portion 2b and an electric motor 3 and other components described below.

A screw 5 is disposed inside the cylindrical portion 2b at a central portion thereof and provided with an end acting as a shaft 5a. A plane gear wheel 4b is secured to the shaft 5a. The motor 3 is fixed onto the frame body 2a, and a plane gear wheel 4a is mounted onto the motor shaft of the motor 3. The plane gear wheels 4a and 4b are engaged with each other and constitute a speed reducer 4. The shaft 5a has a large-diameter portion 5b, and a thrust bearing 5c is disposed between the large diameter portion 5b and the frame body 2a so that the screw 5 rotates smoothly even if a stress directing to an arrow F shown in FIG. 3 is applied to the screw 5. The brake actuating apparatus 2 is further provided with a slider 6 which is screwed onto the screw 5 through many balls not shown. The slider 6 is slidably accommodated inside the cylindrical portion 2b and slides therein when the screw 5 rotates. The screw 5 and the slider 6 constitute a converting member 13 which converts the rotary motion of the motor 3 into a linear motion.

The brake actuating apparatus 2 is further provided with a driving piston 7 accommodated in the cylindrical portion 2b with liquid sealability by seal member such as an O-ring and disposed adjacent to and close contact to the slider 6. A coil spring S is arranged between the driving piston 7 and an end of the cylindrical portion 2b and urges the driving piston 7 in the direction of the arrow F. The frame body 2a is provided with a screw hole penetrating up to the inside of the cylindrical portion 2b in which hole a screw 6a is screwed for preventing the slider 6 from rotating. That is, the slider 6 is provided with a groove along a sliding direction thereof with which the screw 6a engages from a radius direction of the slider 6.

The driving piston 7 and the pad urging piston 9 define a fluid chamber 10 in which a brake fluid is filled. The fluid chamber 10 communicates with a reservoir through a through hole R. The driving piston 7 has a diameter which is smaller than that of the pad urging piston 9. More desirably, an area ratio of the driving piston 7 to the pad urging piston 9 is preferably within a range between one-third to one-tenth.

The rotational torque and direction of the motor 3 is controlled by a command signal from an electronic control unit (ECU) 21 as shown in FIG. 4. That is, the rotational torque and direction of the motor 3 is determined by the ECU 21 in accordance with signals from a depressing force sensor or a stroke sensor arranged at the brake pedal 22 of the vehicle, and if the brake pedal 22 is depressed down with a strong force the motor 3 rotates with a strong torque.

The operation of the brake actuating apparatus according to the first embodiment of the invention will now be described hereinbelow.

If the brake pedal 22 is depressed down the electronic control unit (ECU) 21 receives from the sensor a signal corresponding to the amount of depressing force, and the motor 3 is driven to rotate by a predetermined driving signal generated by the ECU 21. Then, the motor 3 rotates the screw 5 through the speed reducer 4 to the slider 6 so that the slider 6 moves accordingly in the direction opposite to the arrow F shown in FIG. 3. Consequently, the pad urging piston 9 is urged by a force which is a several times to ten times as large as a force applied to the driving piston 7 against the brake pad 11 which presses the disc 12. In this operation, the stress in the thrust direction is held by the thrust bearing 5c, and the brake caliper 1 moves toward the direction of the arrow F by a reaction force so that another pad (not shown) disposed at the other side of the disc 12 is urged against the other side of the disc.

As described above, in the brake actuating apparatus according to the first embodiment of the invention the diameter of the driving piston 7 is arranged smaller than that of the pad urging piston 9. Therefore, the responsibility is improved compared to the conventional apparatus employing a multiple speed reducer and, further, no intricate solenoid clutch is required. Thus the brake actuating apparatus can be manufactured simple in structure and small in size to a large extent.

The brake actuating apparatus of the invention may be applicable to a traction control if the ECU 21 is arranged to input a detection signal from a slip sensor disposed at the vehicle wheel.

Figure 5:
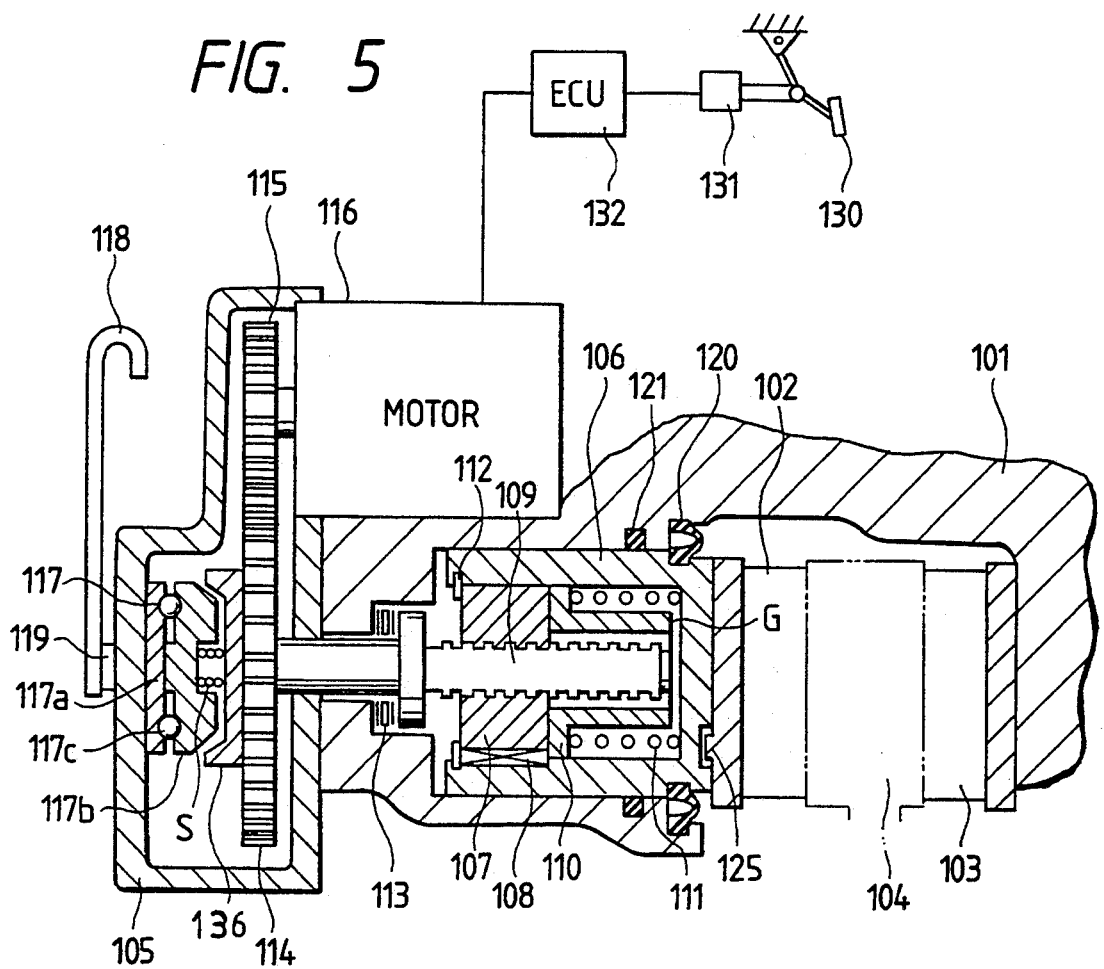
FIG. 5 is a sectional view showing a brake actuating apparatus according to a second embodiment of the invention.

FIG. 5 is a sectional view showing a brake actuating apparatus according to a second embodiment of the invention.

The brake actuating apparatus shown in FIG. 5 is provided with a brake caliper 101 of a floating type which is slidably supported in the axial direction of a rotor 104 bV a known guide member (not shogun). A first and second brake pads 102 and 103 are supported by a support member (not shown). A piston 106 slidably fitted in a cylinder formed in the brake caliper 101 has a concave portion engaging with a protruding portion of the first pad 102 so that the piston 106 is prevented from rotating in the cylinder. Seal members 120 and 121 are fitted between sliding parts of the piston 106 and the cylinder of the brake caliper 101 to thereby avoid dust or foreign materials from entering the piston 106.

The piston 106 has a cylindrical part at the other side of facing the pad 102, and a screw member 109 and a nut member 107 screwing onto the screw member 109 are disposed in the cylindrical part of the piston 106. The nut member 107 is slidably mounted in the cylindrical part of the piston 106 and prevented from rotating by a key 108. The brake actuating apparatus of this embodiment is further provided with a sleeve 110 and a spring 111 disposed between the nut member 107 and a bottom portion of the cylindrical part of the piston 106. The spring 111 always urges the nut member 107 leftwardly of the drawing. A stopper 112 is secured to the piston 106 for preventing the nut member 107 from further moving towards the outside of the cylindrical part of the piston 106. In the condition shown in FIG. 5, an appropriate gap G is formed between the sleeve 110 and the bottom portion of the piston 106.

As mentioned above, the nut member 107 is screwed on the screw member 109 which is rotatably supported by the brake caliper 101. A thrust bearing 113 is disposed between the screw member 109 and the caliper 101. When the screw member 109 rotates the nut member 107 slides along the longitudinal axis of the screw member 109 inside the cylindrical portion of the piston 106. An end of the screw 109 is secured to a gear wheel 114 which engages with a pinion 115 fixedly connecting to a driving shaft of the motor 116. The electric motor 116 is driven by an electronic control unit (ECU) 132 in accordance with a detection signal from a depressing force sensor 131 or a stroke sensor for detecting a depressed amount of a brake pedal 130.

When the brake pedal 130 is depressed down and the sensor 131 detects the depressing force (or stroke of the pedal), the ECU 132 starts to drive the motor 116, the pinion 115 is rotated, the gear wheel 114 is also rotated and then the screw member 109 starts to rotate. The rotation of the screw member 109 causes the nut member 107 to slide in the cylindrical part of the piston 106, and when the nut member 107 moves rightwardly of FIG. 5 the sleeve 110 also moves rightwardly against an elastic force of the spring 111 and finally comes into abutment against the bottom of the piston 106. From this condition, if the nut member 107 further moves rightwardly the first brake pad 102 depresses one side of the rotor 104 and, further, the second brake pad 103 depresses the other side of the rotor 104 by a reaction of the depression of the first brake pad 102, thereby to brake the rotor 104. In the brake actuating apparatus described above, the actuation of the motor 116 produces the brake force to the vehicle wheel. The release of the brake force is achieved by rotating the motor 116 reversely.

The brake actuating apparatus according to the second embodiment shown in FIG. 5 also has a mechanical brake operation system other than the electrical brake operation system disclosed above in consideration of an unexpected electrical defect due to a fault of the sensor or breakdown of electric wires. The mechanical brake operation system is constituted by a friction clutch mechanism 136 and a ball lump mechanism 117 disposed between the gear wheel 114 and a housing 105. The ball lump mechanism includes a pair of cam plates 117a and 117b, steel balls 117c disposed in a groove formed between the cam plates 117a and 117b. The structure of the ball lump mechanism is known and disclosed in detail in Unexamined Japanese Utility Model Application (OPI) No. Hei. 2-18828 and Japanese Patent Publication No. Sho. 60-10214, for example. The cam plate 117b, the shaft 119 and a lever 118 are unitary formed whereas the other cam plate 117a is secured to the housing 105.

When the lever 118 rotates in a plane perpendicular to the sheet of the drawing the shaft 119 also rotates and the cam plate 117b moves rightwardly of FIG. 5 while rotating so that the clutch mechanism 136 comes into engagement. In this condition, further, if the shaft 119 continues to rotate the gear wheel 114 starts to rotate which causes the screw member 109 to rotate, and then the nut member 107 moves further to produce the brake force as described above. When the lever 118 is rotated reversely, the brake force is released.

Figure 6:
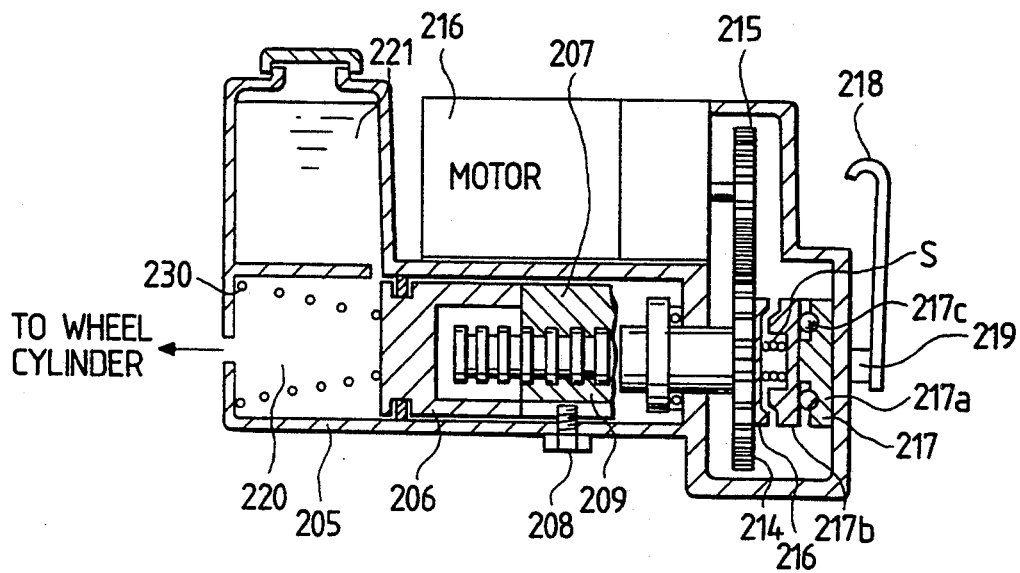
FIG. 6 is a sectional view showing a brake actuating apparatus according to a third embodiment of the present invention.

FIG. 6 is a sectional view showing a brake actuating apparatus according to a third embodiment of the present invention.

The brake actuating apparatus shown in FIG. 6 is of a type in which a piston disposed in a known master cylinder is moved by a motor to thereby generate a brake force. As shown in FIG. 6, the brake actuating apparatus of the third embodiment is provided with a motor 216, a pinion 215 driven to rotate by the motor 216, a gear wheel 214, a screw member 209, a nut member 207 screw-connected onto the screw member 209, a piston 206 secured to the nut member 207, a hydraulic pressure generating chamber 220 for generating hydraulic pressure by a motion of the piston 206, a reservoir 221 and a housing 205 for effectively accomodating these parts and components.

The piston 206 is slidably fitted in a cylindrical part formed in the housing 205. The nut member 207 secured to the piston 206 is provided with a groove along the axial direction of the screw 209, with which groove a rotation preventing element 208 engages to prevent the nut men%her 207 from rotating even if the screw member 209 rotates. The piston 206 is always urged towards rightward of FIG. 6 by an elastic force of a spring 230.

In the brake actuating apparatus according to the third embodiment constructed as described above, when the ECU outputs a drive signal, the motor 216 rotates, the pinion 215 and gear wheel 214 also rotate and then the screw member 209 starts to rotate. The rotational motion of the screw member 209 is converted into a linear motion of the nut member 207 which slides on the screw member 209 while prevented its rotation by the rotation preventing element 208. In this operation, the piston 206 also moves leftwardly in FIG. 6 against the elastic force of the spring 230 together with the nut member 207 because the piston 206 is secured to the nut member 207, thereby to cause the hydraulic pressure generating chamber 220 to produce a predetermined hydraulic pressure. The hydraulic pressure generated by the hydraulic pressure generating chamber 220 is supplied to the wheel cylinder disposed at the vehicle wheels to apply appropriate brake force to the vehicle wheels.

When the motor 216 rotates reversely, the piston 206 is returned to its original position and the brake operation is released.

As described above, the brake actuating apparatus of the third embodiment utilizes the master cylinder structure and, accordingly, when the motor is driven by a by-wire system the brake operation is appropriately applied to the vehicle wheels.

In the brake actuating apparatus of the third embodiment, similar to the second embodiment, the mechanical brake operation system is also assembled in consideration of an electrical defect due to a fault of the sensor or breakdown of electric wires. The mechanical brake operation system is constituted by a clutch mechanism 216 disposed between the gear wheel 214 and a ball lump mechanism 217. The ball lump mechanism 217 includes a pair of cam plates 217a and 217b, steel balls 217c disposed in a groove formed between the cam plates 217a and 217b. The structure of the ball lump mechanism is known and disclosed in detail in Unexamined Japanese Utility Model Application (OPI) No. Hei. 2-18828 and Japanese Patent Publication No. Sho. 60-10214, for example. The cam plate 217b, the shaft 219 and a lever 218 are unitary formed whereas the other cam plate 217a is secured to the housing 205.

When the lever 218 rotates in a plane perpendicular to the sheet of the drawing the shaft 219 also rotates and the cam plate 217b moves rightwardly of FIG. 6 while rotating so that the clutch mechanism 216 comes into engagement. In this condition, further, if the shaft 219 continues to rotate the gear wheel 214 starts to rotate which causes the screw member 109 to rotate, and then the nut member 207 moves further to produce the brake force as described above. When the lever 118 is rotated reversely, the brake force is released.

As described above, with the brake actuating apparatus according to the present invention, the brake control is achieved by the brake by-sire system in the normal condition, and the brake actuating apparatus can be operated by the mechanical brake operation system even if an unexpected electrical defect is occurred due to a fault of the sensor or breakdown of electric wires. Therefore, the brake actuating apparatus according to the invention is highly improved in safety.

The invention is not limited to the afore-described embodiments, however, the various arrangements or modifications can be applicable. For example, the mechanical brake operation system is performed by an operation member such as a side brake lever or the like which is located apart from the brake pedal. Further, the mechanism for moving the piston by an actuation of the lever is not limited to the ball lump mechanism or clutch mechanism described above. For example, the other conventional mechanism for converting the rotary motion of the lever to the linear motion along the axial direction may be employed.

As described above, according to the present invention, since a mechanical brake operation system is assembled in the brake actuating apparatus, the actuator can be operated by the mechanical brake operation system even if an unexpected electrical defect is occurred due to a fault of the sensor or breakdown of electric wires. Therefore, the brake actuating apparatus according to the invention is highly improved in safety. Further, the brake actuating apparatus assembling therein the mechanical braking system may be utilized as a parking brake. Furthermore, the electric control elements and the brake actuating apparatus can be unitary formed to thereby manufacture the brake actuating apparatus simple in structure and low in manufacturing cost.

What is claimed is:

1. A brake actuating apparatus, comprising:
   a brake caliper comprising a frame body and a cylindrical portion;
   a brake pad held by said brake caliper for urging against a brake wheel cylinder for braking;
   an electric motor fixed onto said frame body of said brake caliper, said electric motor being controlled to rotate by a drive signal of an electronic control unit;
   a drive piston slidably held in said cylindrical portion of said caliper, said drive piston having a first piston head;
   means for converting a rotary motion of said electric motor into a linear motion of said drive piston so that said drive piston linearly and non-rotatably slides within said cylindrical portion, said converting means being held in said cylindrical portion of said brake caliper;
   a pad urging piston held in said frame body of said caliper beyond said cylindrical portion and proximate to said brake pad, said pad urging piston for urging said brake pad when said drive piston linearly slides toward said pad urging piston, said pad urging piston having a second piston head; and
   a fluid chamber defined between said pad urging piston and said drive piston, the fluid chamber for transmitting pressure to urge said pad urging piston when said drive piston linearly slides toward said pad urging piston.

2. The brake actuating apparatus of claim 1, further comprising means for reducing rotational speed of said electric motor, said speed reducing means being held in said frame body of said brake caliper and operationally engaged with said motor.

3. The brake actuating apparatus of claim 2, wherein said speed reducing means comprises:
a first gear wheel having a first central portion fixed to a rotational shaft of said electric motor so that said first gear wheel rotates when said electric motor rotates; and
a second gear wheel operationally engaged with said first gear wheel so that said second gear wheel is driven to rotate when said first gear wheel rotates, said second gear wheel having a second central portion; and
said converting means comprises,
a screw means having a shaft portion at one end thereof fixed to said second central portion of said second gear wheel so that said screw means rotates when said second gear wheel rotates; and
a sliding means threadably coupled to said screw means and sliding thereon when said screw means rotates.

4. The brake actuating apparatus of claim 3, wherein said drive piston is disposed in close contact to and moves with said sliding means; and
said fluid chamber is filled with a brake fluid.

5. The brake actuating apparatus of claim 4, wherein said drive piston is sealably fitted in said cylindrical portion of said caliper, and said pad urging piston is sealably fitted in said frame body of said caliper.

6. The brake actuating apparatus of claim 5, further comprising a seal member for sealing said driving piston in said cylindrical portion and said pad urging piston in said frame body.

7. The brake actuating apparatus of claim 6, wherein said seal member comprises an O-ring.

8. The brake actuating apparatus of claim 4, wherein a diameter of said first piston head is smaller than a diameter of said second piston head.

9. The brake actuating apparatus of claim 8, wherein a ratio of a surface area of said first piston head to a surface area of said second piston head is within a range of one-third to one-tenth.

10. The brake actuating apparatus of claim 3, further comprising means for preventing said sliding means from rotating.

11. The brake actuating apparatus of claim 10, wherein said sliding means has a groove along an axial direction, and said rotation preventing means comprises a screw engaging said groove of said sliding means.

12. The brake actuating apparatus of claim 3, further comprising a spring disposed between said frame body of said caliper and said drive piston, said spring for urging said drive piston in a direction away from said pad urging piston.

13. The brake actuating apparatus of claim 1, wherein a diameter of said first piston head is smaller than a diameter of said second piston head.

14. The brake actuating apparatus of claim 13, wherein a ratio of a surface area of said first piston head to a surface area of said second piston head is within a range of one-third to one-tenth.

15. The brake actuating apparatus of claim 1, the apparatus is for use in a vehicle, further comprising: a sensor for detecting one of a depressing force applied to a brake pedal of the vehicle and an amount of stroke of the pedal; and an electronic control unit for outputting a drive signal to said electric motor in accordance with an output signal of said sensor.

16. A brake actuating apparatus disposed on a brake caliper of a vehicle, comprising:
a motor fixed to the caliper;
a converting portion operationally connected to said motor for converting a rotary motion of said motor into a linear motion;
a drive piston residing in the caliper and operationally connected to said motor through said converting portion so that said drive piston linearly and non-rotatably slides within the caliper, said drive piston having a first piston head;
a pad urging piston slidably residing in the caliper, said pad urging piston for urging a brake pad held in the caliper when said drive piston linearly slides toward said pad urging piston, said pad urging piston having a second piston head; and
a fluid chamber for holding brake fluid in the caliper between said drive piston and said pad urging piston, the fluid chamber for transmitting pressure to urge said pad urging piston when said drive piston linearly slides toward said pad urging piston.

17. The brake actuating apparatus of claim 16, wherein a diameter of said first piston head is smaller than a diameter of said second piston head.

18. The brake actuating apparatus of claim 16, wherein a ratio of a surface area of said first piston head to a surface area of said second piston head is within a range of one-third to one-tenth.

19. The brake actuating apparatus of claim 18, further comprising a speed reducer for reducing rotational speed of the motor.

20. The brake actuating apparatus of claim 16, wherein the caliper includes a frame body and a cylindrical portion.

21. The brake actuating apparatus of claim 20, wherein said motor is an electric motor fixed on said frame body, said motor being controlled to rotate by a drive signal from an electronic control unit.

22. The brake actuating apparatus of claim 20, wherein said drive piston slidably resides within said cylindrical portion, and said pad urging piston slidably resides in said frame body beyond said cylindrical portion.

23. A brake actuating apparatus, comprising:
a brake caliper including a frame body and a cylindrical bore extending through the caliper;
a brake pad for engaging a brake wheel cylinder for braking, the brake pad being held by said brake caliper;
an electric motor fixed onto the frame body, the electric motor being controlled to rotate by a drive signal from an electronic control unit;
a drive piston having a first piston head, the drive piston slidably residing in the cylindrical bore;
conversion means for converting a rotary motion of the electric motor into a linear motion of the drive piston so that the drive piston linearly and non-rotatably slides within said cylindrical bore, the conversion means being held in the cylindrical bore;
a pad urging piston having a second piston head, the pad urging piston held in the frame body beyond the cylindrical bore and proximate to the brake pad for urging the brake pad when the drive piston linearly slides toward the pad urging piston, a ratio of a surface area of the first piston head to a surface area of the second piston head being within a range of one-third to one-tenth; and a fluid chamber defined between the pad urging piston and the drive piston, the fluid chamber for transmitting pressure to urge the pad urging piston when the drive piston linearly slides toward the pad urging piston.

24. The brake actuating apparatus of claim 23, further comprising means for reducing rotational speed of the electric motor, the speed reducing means being held in the frame body and operationally engaged with the motor.

25. The brake actuating apparatus of claim 24, wherein the speed reducing means comprises:

a first gear wheel having a first central portion fixed to a rotational shaft of the electric motor so that the first gear wheel rotates when the electric motor rotates; and a second gear wheel operationally engaged with the first gear wheel so that the second gear wheel is driven to rotate when the first gear wheel rotates, the second gear wheel having a second central portion.

26. The brake actuating apparatus of claim 25, wherein the conversion means comprises:

a screw having a shaft portion at one end thereof fixed to the second central portion of the second gear wheel so that the screw rotates when the second gear wheel rotates; and sliding means rotatably coupled to the screw and sliding thereon when the screw rotates.

* * * * *